United States Patent [19]

Orain

[11] Patent Number: 4,571,214
[45] Date of Patent: Feb. 18, 1986

[54] TRANSMISSION JOINT, IN PARTICULAR FOR A MOTOR VEHICLE

[75] Inventor: Michel A. Orain, Conflans Ste Honorine, France

[73] Assignee: Glaenzer Spicer, Poissy, France

[21] Appl. No.: 636,250

[22] Filed: Jul. 31, 1984

[30] Foreign Application Priority Data

Aug. 2, 1983 [FR] France ................. 83 12724

[51] Int. Cl.⁴ ............................................. F16D 3/22
[52] U.S. Cl. .................................... 464/111; 464/124; 464/132; 464/905
[58] Field of Search ............... 464/111, 120, 122, 123, 464/124, 132, 905

[56] References Cited

U.S. PATENT DOCUMENTS 2,235,002  3/1941  Anderson ............................ 464/111
3,613,396  10/1971  Drevard et al. ..................... 464/111

FOREIGN PATENT DOCUMENTS 904256  7/1949  Fed. Rep. of Germany ...... 464/124
2600501  7/1977  Fed. Rep. of Germany .
658219  6/1929  France .
301276  11/1928  United Kingdom .

Primary Examiner—Donald Watkins
Assistant Examiner—Daniel P. Stodola
Attorney, Agent, or Firm—Wenderoth, Lind & Ponack

[57] ABSTRACT

This joint comprises rollers (106) and rolling tracks (102,103) which are unsymmetrical relative to a diametrical plane (D) perpendicular to the axis of the trunnion (105), the facing surfaces of the roller and the rolling tracks being larger on the side of this plane located radially adjacent the exterior of the joint, while the needles are disposed symmetrically relative to this plane. In this way, there is obtained a joint which is capable of rotating at high speed (for example 6,000 rpm) while performing in an excellent manner.

5 Claims, 4 Drawing Figures

TRANSMISSION JOINT, IN PARTICULAR FOR A MOTOR VEHICLE

The present invention relates to transmission joints employed in particular in motor vehicles and adapted to be capable of rotating at high speed.

It is known that constant-speed joints having a tripod element employed mainly for the lateral transmission shafts of automobiles rotating at speeds usually lower than 2,000 rpm, can be constructed with rollers mounted on needles, the mechanical efficiency of such joints being practically as high as that of universal joints which have, on the other hand, the defect of not being of the constant-speed type. Such a version of tripod joints would therefore be a priority better adapted to operate at high speed, for example on the order of 6,000 rpm, than the other types of constant-speed joints, for example ball joints the use of which is restricted to operating angles of a few degrees, bearing in mind their excessive heating.

However, in their present form, the constant-speed tripod joints cannot be employed at high speeds, since the considerable force which is then exerted on the rollers produces very high pressures in the zones of contact between the rollers and the rolling tracks, these zones of contact being located along the outer edges of the rollers. A zero lubrication and an intense abrasion also result in these zones of contact which have for effect a rapid deterioration of the rollers and, as the case may be, the rolling tracks in these zones.

Joints are moreover known (GB-A-301,276 and DE-A-904,256) which have rollers of an unsymmetrical shape but employed under such conditions that this unsymmetry does not result in any particular advantage and more precisely does not enable the joints in question to operate at high speeds.

An object of this invention is to provide a transmission joint in which the drawback mentioned hereinbefore is avoided and which is capable of operating under satisfactory conditions at high speeds.

The invention therefore provides a transmission joint of the type comprising a first element defining at least a radial trunnion on which is rotatively mounted, by means of needles, a roller having a spherical outer shape and provided with a bore, and a second element defining at least two rolling tracks for the roller, said two rolling tracks having in section in a plane perpendicular to their mean line, a roughly circular shape constituted by two arcs of a circle which have a radius slightly greater than that of the roller, wherein the needles are disposed unsymmetrically relative to a plane perpendicular to the axis of the trunnion and containing the centre of the roller, the roller extends radially inwardly of the joint roughly to the region of the inner ends of the needles and extends radially outwardly of the joint beyond the other ends of the needles, the associated rolling tracks having corresponding enveloping angles.

According to another feature, the spherical surface of the roller extends, on the side thereof located radially outwardly of the joint, to the vicinity of the bore of this same roller.

A better understanding of the invention will be had from the following description of one embodiment which is given merely by way of example with reference to the accompanying drawings, in which.

It must be understood that, in these various diagrams, the various clearances have been considerably exaggerated in order to facilitate the understanding of the operations.

Figure 1:
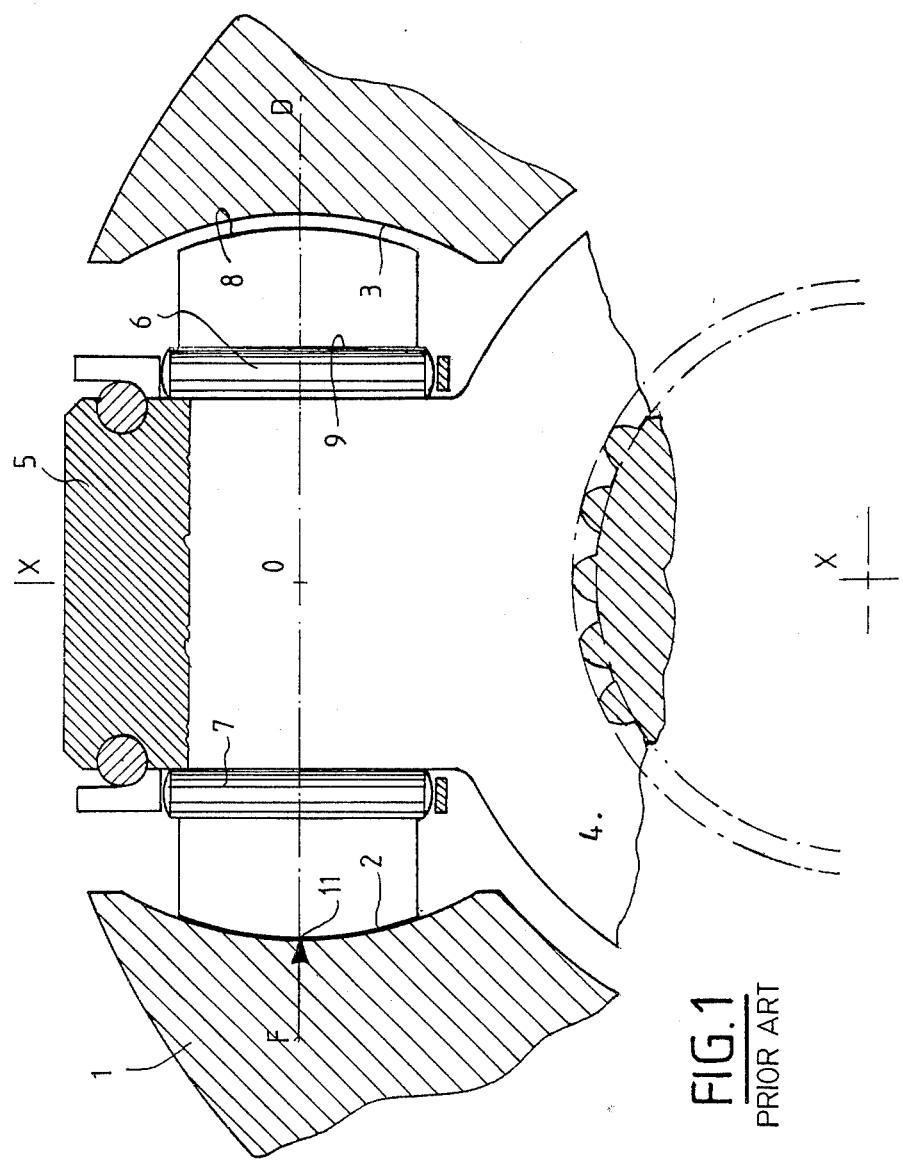
FIG. 1 is a diagrammatic sectional view of a part of a joint of conventional design.

FIG. 1 shows a part of a conventional tripod joint comprising a tulip element 1 defining rolling tracks 2, 3 and a tripod element 4 defining three radial trunnions 5 on which rollers 6 are mounted by means of needles 7.

The bearing and retaining means of these needles are conventional in this type of joint and will not be described in detail.

Each roller has a spherical outer surface 8 and a bore 9 coaxial with the axis X—X of the trunnion on which it is mounted. The rolling tracks associated with a given roller are formed by two portions of cylindrical or toric surface the mean line of which passes through the point O, this mean line being either rectilinear or formed by an arc of a circle and being in any case perpendicular to the plane of the drawing.

In this conventional joint, the roller, its needles and its rolling tracks are disposed symmetrically relative to a diametrical plane D passing through the point O, the centre of the roller, and perpendicular to the axis X—X of the trunnion.

Figure 2:
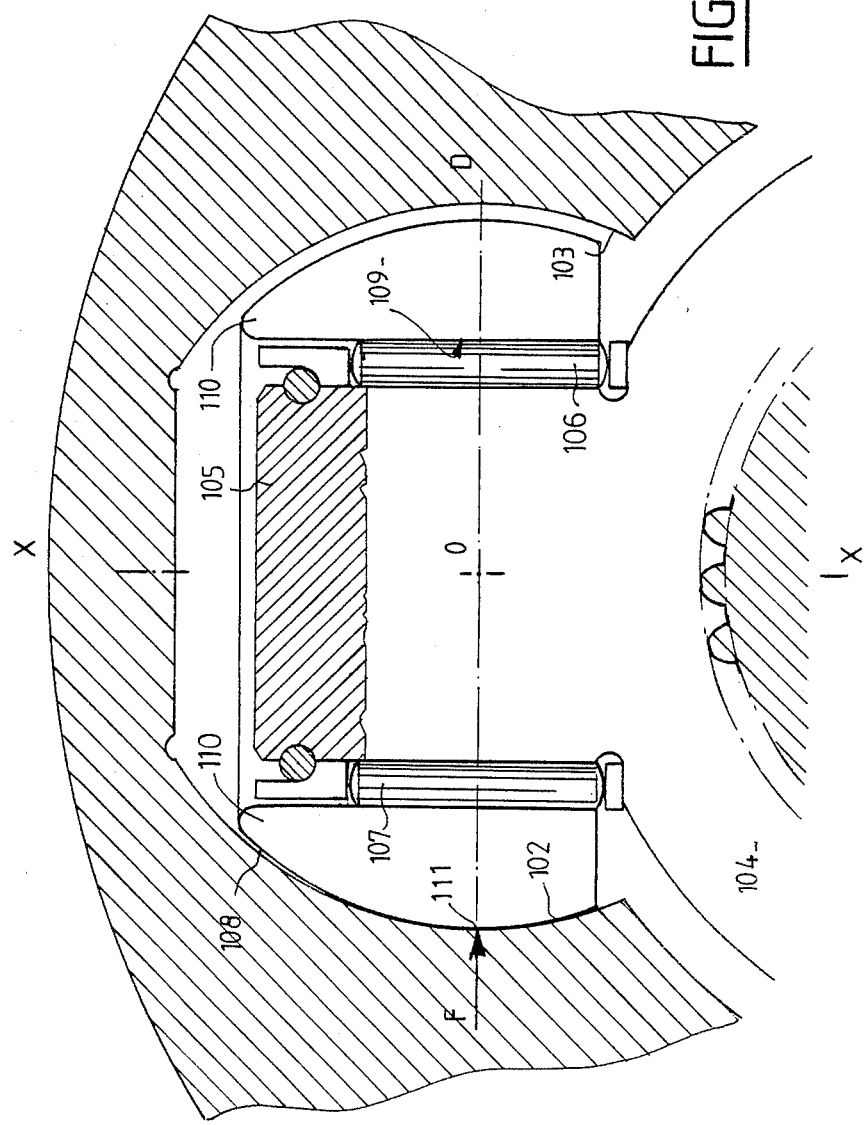
FIG. 2 is a similar view of an improved joint according to the invention.

FIG. 2 shows a joint of the same type but improved in accordance with the invention. The elements corresponding to those of the joints of FIG. 1 are designated in FIG. 2 by the same reference numerals increased by one hundred. According to this improvement, the rollers and their rolling tracks have a shape which is unsymmetrical relative to the diametral plane (D) perpendicular to the axis X—X of the trunnion and passing through the point O, which results, in the plane of the Figure, in an unsymmetrical shape relative to the diameter (D). The part of the roller extending radially outwardly of the joint is preferably extended beyond the end of the needles 107 so that the spherical outer surface 108 of the roller practically intersects the bore 109. Thus, in radial section, the roller has a shape defined by the bore 109 and the outer spherical surface 108 which tapers substantially to a point from said plane D as shown in FIG. 2. However, in order to avoid rendering this zone fragile, a rounded portion 110 is provided in the junction zone between the spherical surface and the bore 109.

Further, the two opposed rolling tracks 102, 103 cooperating with the roller are extended radially outwardly in such manner as to envelop the roller correctly.

On the other hand, on the side of the plane (D) located adjacent the interior of the joint, the roller 106 only extends to the inner ends of the needles 107. Note that the latter are arranged symmetrically relative to the plane (D) in contrast to the roller and its rolling tracks.

In FIGS. 1 and 2, the joint has been shown under conditions where the torque to be transmitted is high and the speed low, which occurs for example when the vehicle starts to move off with the lowest speed ratios of the gear box. The driving force applied to the roller is then exerted as shown by the arrow F in FIGS. 1 and 2.

Figure 3:
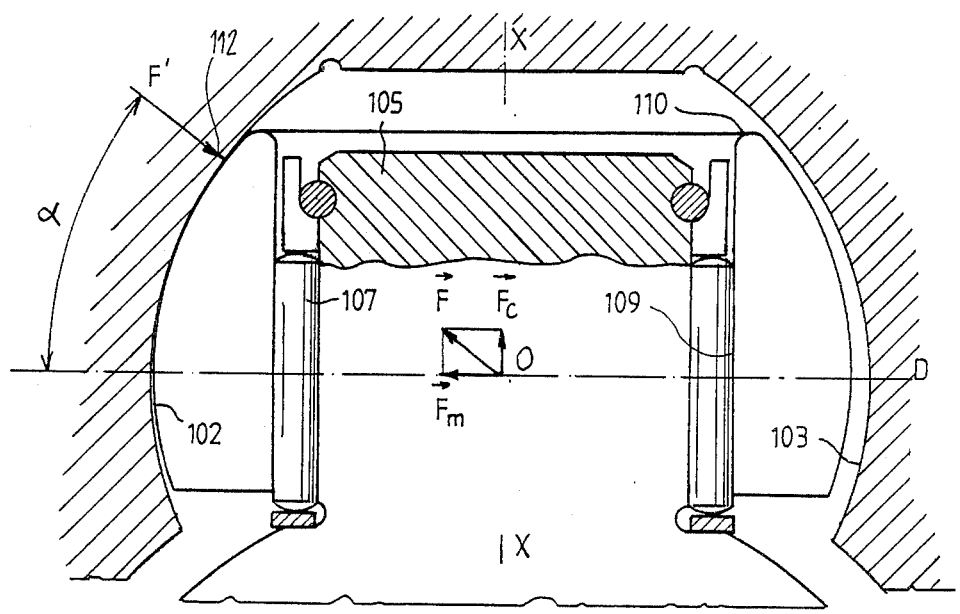
FIGS. 3 and 4 are two diagrams illustrating the operation at high speed of the joint according to the invention and a joint of the prior art.

When the speed of rotation increases and the torque to be transmitted is very low, for example when the accelerator is released, the force F' transmitted is inclined at an angle α relative to the diametrical plane D owing to the relatively large magnitude assumed by the centrifugal force $F_c$ applied to the roller as compared to the driving $F_m$. The centre of the ellipse of contact between the roller and its rolling track, which was located in the diametrical plane at 11 and 111 in the cases shown in FIGS. 1 and 2, has moved to 112 in FIG. 3. In the last-mentioned configuration, the roller however operates correctly and the ellipse of contact can extend to the end of the spherical zone 102.

If it is observed that the force F' resulting from the driving force and the centrifugal force is less than in the conditions shown in FIG. 2, owing to the small transmitted torque, it can be concluded that the Hertz pressure is relatively low, which results in a good lubrication, low friction and a long life.

Indeed, when rotating at high speed, the lubricant is subjected to the centrifugal acceleration and the rolling speed of the roller is appreciable so that the dynamic lubrication maintains a beneficial film of oil between the spherical surface of the roller and the cylindrical or toric surface of the rolling track throughout the length of the ellipse of contact.

Further, the force of contact F' is always in the direction toward the centre of the roller and it perfectly balances the centrifugal forces $F_c$ and the driving force $F_m$, the latter being, as before, located in the plane of symmetry of the ring arrangement of needles.

Figure 4:
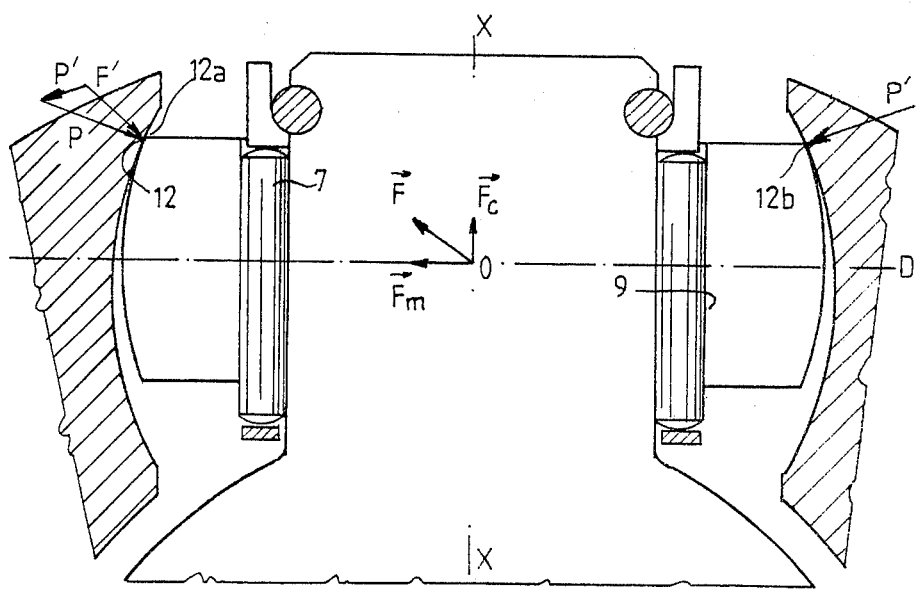

FIG. 4 shows the operation of a roller of a conventional tripod joint under the same conditions of high speed and low torque. It will then be observed that, bearing in mind the smaller extension of the spherical surfaces of the roller facing the rolling tracks, under the effect of the centrifugal force, the upper edge of the roller rapidly comes into contact with the two rolling tracks. Consequently:

1. The same force F' is no longer sufficient to counterbalance the effect of the centrifugal force applied to the roller.

2. The resulting force P applied to the upper edge 12a of the roller is equal to the geometric sum of the force P', applied to the edge 12b of the roller on the opposed rolling track, and the force F'. These two forces P and P' are necessarily directed toward the axis of the rolling track passing through the point O.

3. The contacts at 12a and 12b are theoretical point contacts, which signifies the presence of very high pressures on the edges of the rollers, zero lubrication and an intense abrasion.

4. The sum of the forces P and P' applied to the roller is distinctly greater than the force F' applied to the roller according to the invention under the same conditions of torque and speed of rotation.

5. The contact at 12b between the roller and the rolling track creates a large frictional resistance since the relative speed between the edge of the roller and the rolling track is high. Consequently, there is an appreciable mechanical loss and cyclic axial pulsations induced in the constant-speed joint.

The comparison of these two operations consequently reveals the undeniable advantage of the improvement according to the invention over the conventional arrangement.

I claim:

1. A transmission joint comprising a first element having a first axis of rotation and defining at least one radial trunnion having a second axis of rotation extending radially from said first axis, a roller having a spherical outer contour and provided with a bore, needles interposed between the bore and the trunnion for rotatively mounting the roller on the trunnion, and a second element defining at least two rolling tracks for the roller, said two rolling tracks having, in section in a first plane perpendicular to their means line, a substantially circular shape constituted by two arcs of a circle having a radius slightly larger than the radius of the spherical surface of the roller, the roller being unsymmetrical relative to a second plane which contains a centre of said spherical contour and is perpendicular to said second axis and the roller having a sectional shape in a radial plane containing said first axis defined by said bore and said spherical contour which tapers substantially to a point from said second plane radially outwardly of said first axis, the roller having a greater axial extent outwardly of said second plane than inwardly of said second plane, said two rolling tracks extending at least to an outer end of the roller under all operating conditions of the transmission joint and said needles being substantially symmetrically disposed relative to said second plane.

2. A transmission joint according to claim 1, wherein the spherical surface of the roller extends on a radially outer side of the roller relative to said first axis substantially to the bore.

3. A transmission joint according to claim 2, wherein the spherical surface and the bore of the roller are interconnected by a rounded portion.

4. A transmission joint according to claim 1, which is of the constant-speed type, said first element being a tripod element.

5. A transmission joint according to claim 1, wherein said point to which said sectional shape of the roller substantially tapers is rounded to an extent to avoid fragility of the roller in the region of said point.

* * * * *